United States Patent

Webb et al.

[11] Patent Number: 5,363,396
[45] Date of Patent: Nov. 8, 1994

[54] HALOGEN GENERATOR

[75] Inventors: Colin E. Webb, Kidlington; Gerard S. McGrady, Oxford, both of Great Britain

[73] Assignee: Oxford Lasers Limited, Kidlington, United Kingdom

[21] Appl. No.: 809,488

[22] PCT Filed: May 21, 1991

[86] PCT No.: PCT/GB91/00799
§ 371 Date: Jan. 14, 1992
§ 102(e) Date: Jan. 14, 1992

[87] PCT Pub. No.: WO91/18433
PCT Pub. Date: Nov. 28, 1991

[30] Foreign Application Priority Data

May 23, 1990 [GB] United Kingdom ............ 9011535.3

[51] Int. Cl.⁵ ............................................... H01S 3/72
[52] U.S. Cl. .......................................... 372/57; 372/59; 372/34
[58] Field of Search ............................ 372/34, 57, 59

[56] References Cited

U.S. PATENT DOCUMENTS 3,989,808  11/1976  Asprey ................. 423/503
4,249,143  2/1981   Eden ................... 372/57

FOREIGN PATENT DOCUMENTS 165383A  7/1987  Japan .
109380A  5/2987  Japan .

Primary Examiner—Georgia Y. Epps
Attorney, Agent, or Firm—Spencer, Frank & Schneider

[57] ABSTRACT

A halogen generator which uses a material which absorbs commercially available halogen and, on being heated, releases the halogen in a very pure form, i.e. >99.7%. Such a generator can be used in a gas management system for an excimer laser in which the laser gas contains a halogen donor, an active rare gas and an inert gas diluent. Cleaners are provided to enable the removal from the laser gas mixture of contaminants which build up in operation of the laser and the halogen gas generator is provided to replace halogen lost in the contaminants and elsewhere. The generator can be operated even when the laser is in operation so that a desired partial pressure of the halogen can be maintained.

25 Claims, 2 Drawing Sheets

HALOGEN GENERATOR

BACKGROUND OF THE INVENTION

Excimer lasers are of a class of ultra violet gas lasers with applications in scientific, medical and industrial markets.

The gas mixtures used in excimer lasers contain gases which create contaminants. The gas mixture of such a laser may have as its main constituents, i) a halogen donor (typically 5 millibars of hydrogen chloride or fluorine). Henceforth in this specification and in the appended claims, the halogen donor is referred to simply as 'halogen', ii) an active rare gas (typically 200 millibars of argon, krypton or xenon), iii) an inert gas diluent (typically 3000 millibars of helium or neon).

Halogens are extremely corrosive, tending to corrode the materials of the laser interior to form contaminant compounds. Once contaminated the laser gas mixture has to be replaced. Because the mixtures are made up from relatively expensive rare gases, gas lifetime is important and, as the gas mixture becomes contaminated, laser performance is impaired. Contaminants can build up over a relatively short period, hours or days, depending on the amount of use the laser is subjected to, and replacing the gases is expensive and the laser usually has to be put out of commission whilst this is being done. This is particularly significant in industrial markets where downtime can add considerably to process costs.

Considerable efforts have been made to extend the lifetime of excimer laser gases and to identify the contaminants which are created during operation to facilitate their removal. (See, for example, UK Patent No 2,126,327).

One of the methods which has been developed for removing contaminants from an excimer laser gas mixture, involves passing the laser gas over a surface which reacts chemically with the contaminants thereby leaving them on the coated surface as a solid residue.

Although the inert components of the gas mixture do not react with this cleaner, the halogen donor does and, as a result, it also is completely removed from the gas mixture. Steps therefore have to be taken to replace the halogen after passage through the chemical cleaner.

Another often more effective way of removing these contaminants is to condense them on to a cold surface. A cryogenic condenser is disclosed in UK Patent No 2,126,327 (referred to above) which uses liquid nitrogen as its operating medium but provides a range of temperatures above the temperature of the liquid nitrogen, selectively to condense different contaminants. The laser gas circulates continuously through the condenser during laser operation.

During maintenance of the laser, by allowing the contaminants to warm up to ambient temperature so that they become gaseous, they can be disposed of as waste gases. The rare gases and the halogens have significantly high vapour pressures at those temperatures at which most of the contaminants can be condensed out of the gas mixture and they do not condense.

In normal operation the output of an excimer laser gradually deteriorates due to the build up of contaminants and the loss of halogen which combines with various materials to form the contaminants.

In order to compensate for this loss of halogen, a further technique which is used is to inject additional halogen into the laser system at regular intervals. However, this has the effect of producing a sudden increase in the laser output because the proportion of halogen in the system is suddenly increased, but it does not prevent the subsequent steady fall in output after the injection of the halogen and a further injection of halogen then become necessary. The steady fall in output can be compensated by gradually increasing the operating voltage of the excimer laser but this effects adversely the other laser parameters such as beam quality, pulse duration and beam uniformity. In any critical industrial process such changes are unacceptable.

The long term performance and hence usefulness, of an excimer laser is therefore degraded by, a) Build up of impurities

Both chemical and cryogenic cleaners will remove impurities from a laser gas mixture. However, chemical cleaners also completely remove the gaseous halogen whilst cryogenic cleaners are unable to remove very volatile impurities because a condenser operating at a temperature low enough to cause them to condense out, would also cause some of the active constituents of the laser gas mixture to condense out.

b) Loss of halogen

The loss of halogen due to its combination with other materials in the laser to form contaminants, can be rectified by regular additions of the halogen but if this is effected by sudden injections of the gas it causes large increases in the laser output. While the output power can be stabilized by voltage changes, other parameters cannot be held constant during this process and the laser beam quality is affected.

In addition, when fluorine is used as the halogen, it has to be stored in a gas container near the laser. Fluorine is a particularly difficult material to handle, requiring considerable safety precautions. The provision of the necessary safety housing and control equipment adds expense to the operation of the laser. In some circumstances, for example in certain medical applications, the safety problems associated with the storage of large quantities of fluorine in high-pressure cylinders can rule out completely the use of excimer lasers.

c) Build up of dirt on the laser windows

The output of an excimer laser degrades over an extended period due to the increasing opacity of the laser windows requiring the laser to be shut down for the windows either to be cleaned or replaced. There are several factors leading to opacity of the windows, the most severe being the build up of dust on the internal face of the window. The dust is normally generated by erosion of the pre-ioniser pins or pitting of the electrodes. Such processes are aggravated by the formation of local arcs in the discharge and these themselves may be caused by the build up of impurities in the gas.

In an excimer laser system use of one or both of the above described gas purification techniques allows the level of contaminants to be kept sufficiently low for an acceptable gas life to be achieved. However, as already explained, as contaminants are created they consume halogen and the lowering of the halogen content reduces the laser output. The present invention obviates this problem in an excimer laser using fluorine or hydrogen chloride, by compensating for losses of halogen so as to enable the output of the excimer laser system to be kept at a steady level.

SUMMARY OF THE INVENTION

According to the present invention there is provided a halogen generator comprising a material capable of absorbing commercially available halogen and means for heating said material to evolve pure, gaseous halogen, characterised by means for controlling the heating of said material whereby to control the vapour pressure of halogen generated from said material. In particular, when the halogen is fluorine, the material is a metal fluoro complex or compound (i.e., a metal fluoro complex/compound). Preferably, the halogen is fluorine and said material is a fluoro-nickel compound. Alternatively, the halogen is preferably hydrogen chloride and said material is zeolite.

The invention also provides a gas management system for an excimer laser which has a halogen donor, the gas management system comprising a halogen generator comprising a material capable of absorbing commercially available halogen and means for heating said material to evolve pure, gaseous halogen, characterized by means for controlling the heating of said material whereby to control the vapour pressure of halogen in the excimer laser.

BRIEF DESCRIPTION OF THE DRAWINGS

An embodiment of the invention will now be described, by way of example only, with reference to the accompanying drawings in which.

DESCRIPTION OF THE PREFERRED EMBODIMENTS

Figure 1:
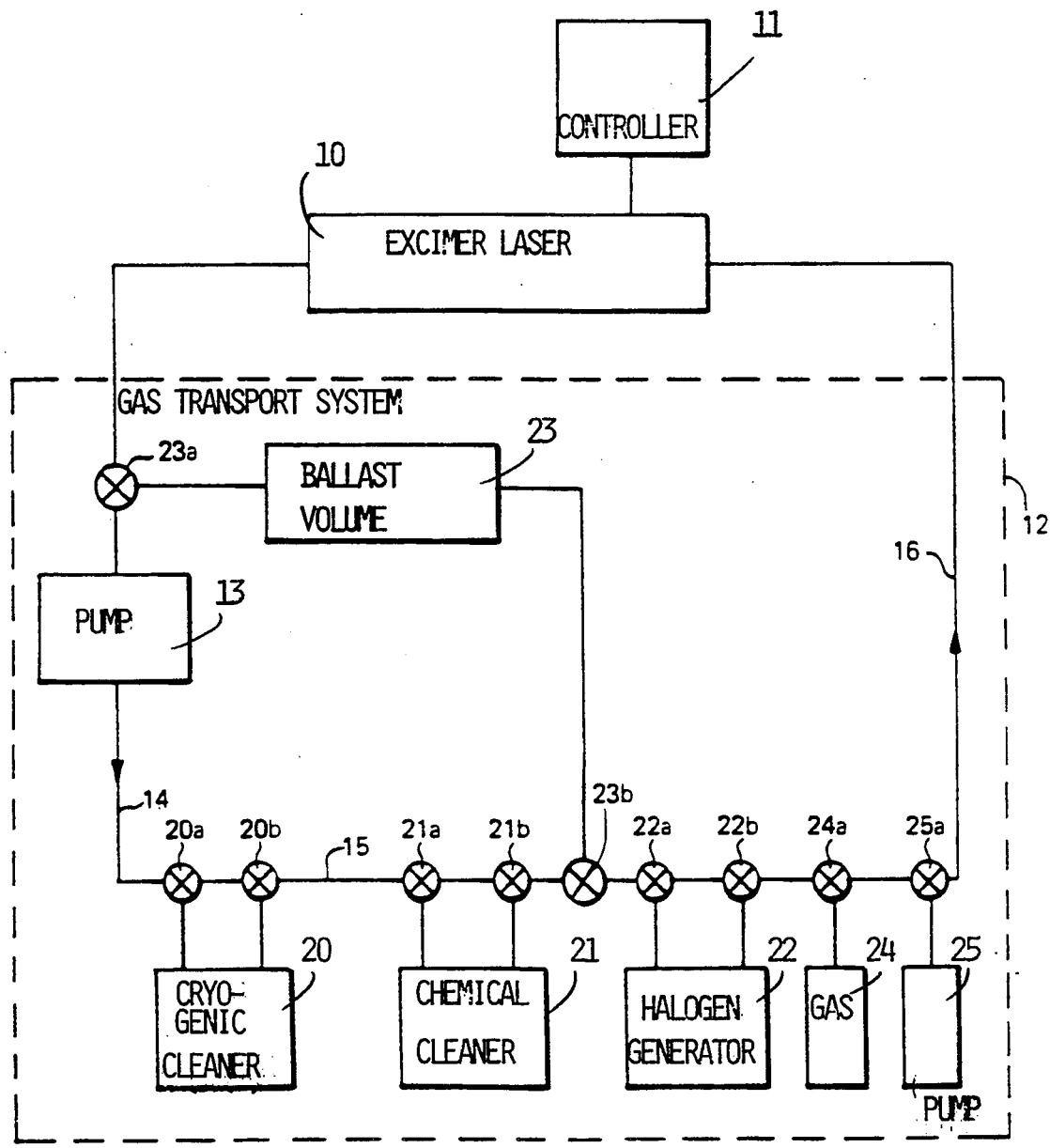
FIG. 1 is a diagram of an excimer laser system using fluorine as its halogen and having in its gas system a halogen generator constructed in accordance with the invention, and, FIG. 2, 3 and 4 are diagrams of laser systems having halogen generators constructed in accordance with the invention.

FIG. 1 shows an excimer laser system comprising an excimer laser 10 arranged to be operated under the control of a controller 11. The controller 11 includes electrical circuitry (not specifically shown) to provide excitation to the laser 10 and to provide all the necessary control functions for laser operation.

Detailed Description

A gas management system 12 for the laser is shown enclosed in broken lines. This system can be manufactured as part of the laser or as a separate entity for connection to the laser 10 and controller 11. The gas management system includes a circulating pump 13, arranged to circulate gas from the laser 10 in the anticlockwise direction as seen in the diagram, through pipes 14, 15 and 16 and back into the laser 10. The gas management system 12 includes a cryogenic cleaner 20 which can be of the type disclosed in UK Patent 2,126,327 referred to above. This cleaner 20 is connected into line 15 through two valves 20a and 20b which enable flow of gas through the cleaner to be controlled. In normal operation the whole of the gas mixture circulated by pump 13 is passed through cleaner 20.

Over a period of time some impurities, such as $CF_4$, which will not be trapped by the cryogenic cleaner 20, will build up in the laser gas mixture. To remove these impurities, a chemical gas cleaner 21 of the type described above is arranged in the circuit. This cleaner 21 is connected into line 15 through two valves 21a and 21b which enable flow of gas through the cleaner 21 to be controlled. Cleaner 21 can either be set up so that some of the system gas passes through it continuously or, when the laser is shut down for maintenance, the gas mixture can be diverted completely through it. In either case, the operation of this cleaner, in addition to removing the contaminants, will remove all of the gaseous halogen from the system gas which passes through it.

A halogen generator 22 operates either under the control of the laser controller 11 or independently, to generate halogen and to inject it automatically into the gas circuit so as to maintain a constant halogen partial pressure in the laser system gas. This generator 22 is connected into line 15 through two valves 22a and 22b which enable flow of gas through the generator to be controlled. The halogen generator 22 is described in more detail below.

In the course of normal operation of the laser, the system gas is passed continuously through the cryogenic cleaner 20 and all or part of the gas is passed through the generator 22. In this way gaseous impurities are continuously removed by cleaner 20 and the concentration of halogen is continuously topped up by the halogen generator 22. While continuous operation is preferred, the halogen generator system could be used intermittently.

The chemical cleaner 21 is positioned in the circuit so that when it is used continuously, gas leaving it can be made to flow immediately through the halogen generator 22 so that any deficiency in the halogen content will have been compensated by the generator 22 before the gas reaches the laser 10. When the cleaner 21 is used during maintenance the halogen generator 22 is bypassed until the laser gas mixture has been circulated sufficiently through the chemical cleaner 21 to be substantially clean of contaminants. The chemical cleaner is then isolated and the halogen generator 22 re-connected in order to replace the halogen lost during chemical cleaning. A mechanical filter (not specifically illustrated in the diagram) is incorporated in generator 22 so that any remaining particulate matter will be removed from the gas as it leaves.

A ballast volume 23 is provided into which the whole contents of the laser gas system can be transferred by operation of valves 23a and 23b, to enable regular maintenance, such as cleaning or replacing the laser windows, to be carried out. The system gas will then be returned to the laser system and passed through the cryogenic cleaner 20 and halogen generator 22 from the ballast volume 23 thus ensuring that the gas is as clean as possible and that it has the desired halogen content.

Any loss of the rare gases can also be made up by an injection of the appropriate gas from gas bottle 24 which can be connected to the gas circuit through valve 24a. A vacuum pump 25 can also be connected to the circuit through its valve 25a, for completely purging the system.

The halogen generator 22 contains a solid; in the case of fluorine this is a compound or mixture, having the composition $K_3NiF_7$ (see for example U.S. Pat. No. 3,989,808 Asprey) and containing Ni(IV), and it uses the formation and decomposition of Ni(IV) complexes with KF to maintain a constant partial pressure of fluorine in the gas mixture by regulation of the temperature of the solid. This solid is typically prepared using commercial elemental fluorine, which is about 98% pure, to fluorinate a mixture of KF and $NiF_2$ in approximate proportions 3:1 by heating the mixture to a temperature in the range 200° C. to 1000° C. under a pressure of 1 to 10 atmospheres until no further uptake of fluorine occurs. The temperature of the mixture may then be lowered below 100° C. and the vessel evacuated to remove residual fluorine and impurities. By subsequently heating the solid to between 150° C. and 250° C., fluorine at the required partial pressure, with a purity of about 99.7% or more, is regenerated continuously, the chemical reaction being, $$K_3NiF_7 \rightarrow K_3NiF_6 + \tfrac{1}{2}F_2$$

In this specification and in the appended claims, the 'pure flourine' means fluorine of this order of purity produced by the above or other like method. The Ni(IV) starting material can be replaced by Ni(III) which forms the complex $K_3NiF_6$ which can then be refluorinated to $K_3NiF_7$.

Alternatively, an admixture of solid fluoro-complex like $K_2NiF_6$ with a solid Lewis acid of sufficient strength, e.g. $BiF_5$ or $TiF_4$, is capable of promoting displacement reactions such as, $$K_2NiF_6 + 2KBiF_5 \rightarrow 2KBiF_6 + NiF_2 + F_2$$

Other potential starting materials for use in the flourine generator include (for examples see K. O. Christie & R. D. Wilson, Inorg. Chemistry, 26,2554 (1987),
$K_2NiF_6$ with $BiF_5$
$Cs_2CuF_6$ with $BiF_5$
$Cs_2MnF_6$ with $BiF_5$
$K_2NiF_6$ with $TiF_4$
$K_2NiF_6$ with $TiF_4$ and $BiF_5$
$NF_4BiF_4$ Instead of using elemental fluorine to fluorinate the mixture, inert gas/fluorine mixtures may be used; this has attractions on safety grounds.

When the generator is exhausted, recharging can be effected under similar conditions to those described above for the initial charging. In the case of hydrogen chloride, a zeolite (type AW-500) is used to absorb gaseous hydrogen chloride at ambient temperature. Regulation of the temperature of vessel in a manner analogous to that described above for the fluorine generator, allows the partial pressure of hydrogen chloride in the gas mixture to be maintained at a constant level. On heating the generator to a specific temperature between 30° C. and 200° C. hydrogen chloride at the required partial pressure and with a purity of 99.8% or more is regenerated continuously. When the generator is exhausted, it can be recharged by admitting gaseous hydrogen chloride to the zeolite at ambient temperature until no further uptake of the gas occurs.

In both cases the halogen pressure inside the closed gas system is self-regulating. This is because in both cases there exists a chemical equilibrium between the gaseous halogen and that held in the solid.

Thus for a given specified temperature, a partial pressure of halogen below the equilibrium value for that temperature will lead to halogen being released by the generator. A partial pressure of halogen above the equilibrium value for that temperature will result in halogen being absorbed by the generator.

By controlling the temperature of the generator a constant partial pressure of halogen is thus maintained in the excimer laser, thereby alleviating all the problems of change of beam quality during operation associated with other methods of halogen addition.

Figure 2:
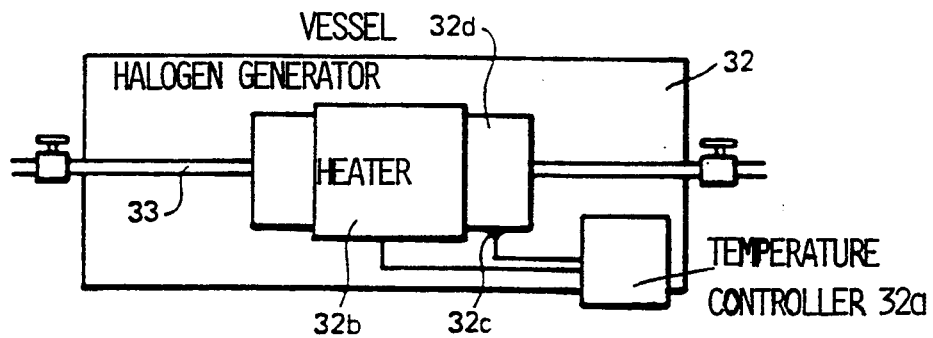

Referring now to FIG. 2, there is shown a halogen generator 32 arranged for connection to a laser (not specifically shown). The generator 32 has a temperature controller 32a located within the generator and arranged to maintain the temperature in the generator at a predetermined value. The controller 32a is coupled to an electrical heater 32b and a thermocouple 32c for control of the temperature in vessel 32d of the generator. The gas supply to the laser passes along pipe 33 and through the vessel 32d of generator 32.

Figure 3:
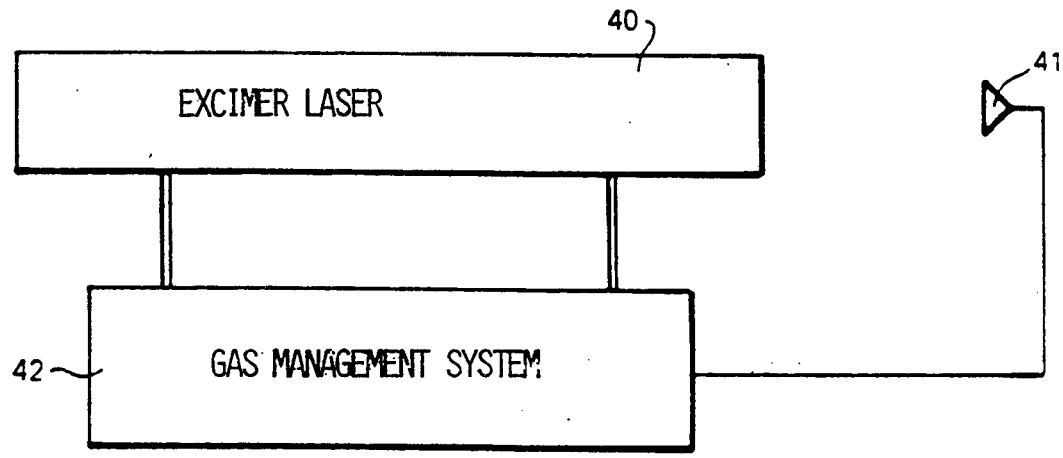

FIG. 3 shows an alternative arrangement in which the energy output of an excimer laser 40 is used to regulate the temperature of a halogen generator so as to maintain an optimum amount of halogen in the laser. In this case the energy output of excimer laser 40 is measured by a power meter 41 and this, in turn is connected to a temperature controller, such as that shown in FIG. 2, housed in a gas management system 42, in such a manner as to maintain the laser power output at a required value.

Figure 4:
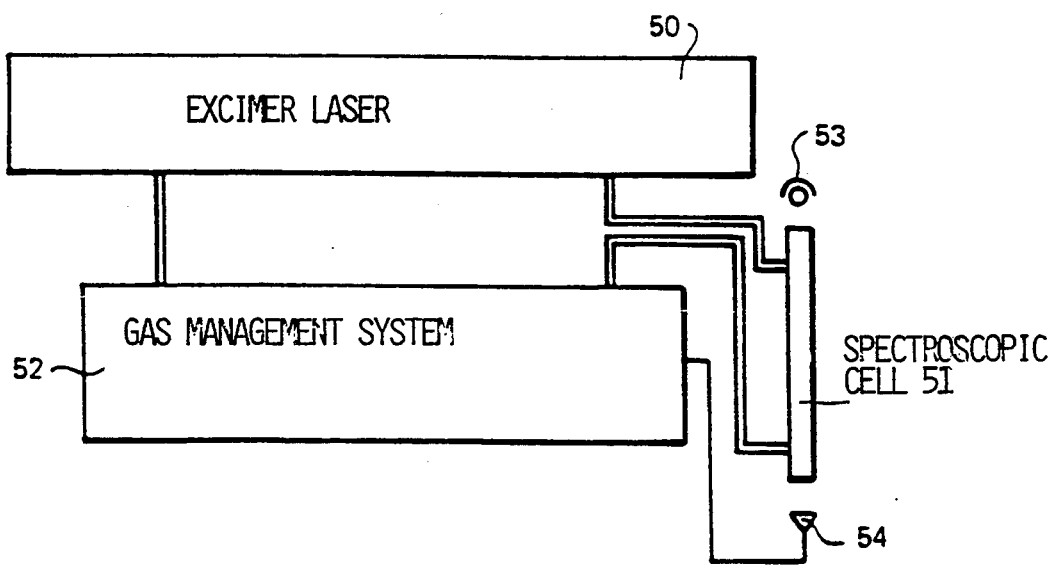

A third method of controlling the partial pressure of halogen in a laser is illustrated in FIG. 4. Here, a spectroscopic cell 51 is connected in series with the laser 50 and gas management system 52, and the halogen concentration in the gas mixture is monitored spectrometrically using a radiation source 53 and a detector 54. The detector 54 is connected to a temperature controller, which can again be similar to that shown in FIG. 2 and is housed in gas management system 52, in such manner as to maintain the laser power output at a required level.

The system of the present invention is particularly beneficial in industrial applications. It is possible that, provided other laser components allow, an excimer laser could operate for months on a single gas fill rather than days or hours as is now the case. This would result in major savings in gas costs and reduced system downtime.

The halogen generators described herein have the additional advantage that at ambient temperature there is no possibility of halogen leakage into the environment as there is a negligible vapour pressure of halogen in the generator. This is much safer than using the present high-pressure gas cylinders filled with hydrogen chloride or a halogen/inert gas mixture. Hence safety costs are reduced and some safety-critical applications (e.g. medical) of excimer lasers are made possible.

In commercial excimer laser installations fluorine is introduced diluted with a large excess of a rare gas for safety reasons thus altering the relative amounts of the rare gas present. Thus, a further advantage of the present invention over the conventional technique of topping up the fluorine concentration with bottle gas, is that it does not give rise to a build up of diluent rare gas which would change the buffer gas pressure within the laser from its optimum value, and once again change the laser beam characteristics.

In the form described herein the halogen generator is designed for use in excimer laser installations. However, the generator could be used for other applications in which a steady controllable vapour pressure for pure halogen is required, e.g. to provide pure fluorine in the etching of silicon wafers in the electronics industry.

We claim:
1. A fluorine generator comprising a metal fluoro complex/compound capable of generating fluorine upon heating;

means for heating said complex/compound to evolve pure, gaseous fluorine, said fluorine having a vapour pressure; and means for controlling the temperature within the generator to control the vapour pressure of fluorine generated from said complex/compound.

2. A fluorine generator as claimed in claim 1 wherein the metal fluoro complex/compound is selected from the group consisting of fluoro-nickel compounds and an admixture of a fluoro-complex with a Lewis acid.

3. A fluorine generator as claimed in claim 1 wherein the metal fluoro complex/compound is selected from the group consisting of a Ni(IV) compound, a Ni(IV) mixture, a Ni(III) compound, a Ni(III) mixture, an admixture of a fluoro-complex with a Lewis acid, and a compound which evolves fluorine via thermal decomposition.

4. A fluorine generator as claimed in claim 3 wherein each of said Ni(IV) compound and said Ni(IV) mixture is $K_3NiF_7$, each of said Ni(III) compound and said Ni(III) mixture is $K_3NiF_6$, said admixture of a fluoro complex with a Lewis acid is selected from the group consisting of $K_2NiF_6$ with $BiF_5$, $Cs_2CuF_6$ with $BiF_5$, $Cs_2MnF_6$ with $BiF_5$, $K_2NiF_6$ with $TiF_4$, and $K_2NiF_6$ with $TiF_4$ and $BiF_5$, and said compound which evolves fluorine via thermal decomposition is $NF_4BiF_4$.

5. A fluorine generator as claimed in claim 1 wherein the complex/compound is a fluorinated mixture of KF and $NiF_2$ in the approximate proportions of 3:1.

6. A fluorine generator as claimed in claim 5 wherein the fluorinated mixture is heated to a temperature in the range 200° C. to 1000° C. at a fluorine partial pressure in the range 1 to 10 atmospheres in order to fluorinate said mixture.

7. A fluorine generator as claimed in claim 6 wherein the fluorinated mixture is heated to a temperature in the range 150° C. to 250° C. in order to evolve pure, gaseous fluorine.

8. A hydrogen chloride generator comprising a zeolite for absorbing commercially available hydrogen chloride, said hydrogen chloride having a vapour pressure;

means for heating said zeolite to evolve pure, gaseous hydrogen chloride; and means for controlling the heating of said zeolite to control the vapour pressure of hydrogen chloride generated from said zeolite.

9. A gas management system for an excimer laser, the gas management system comprising a fluorine generator including a metal fluoro-complex/compound for generating fluorine upon heating;

means for heating said complex/compound to evolve pure, gaseous fluorine, said fluorine having a vapour pressure;

means for introducing said fluorine into an excimer laser; and means for controlling the temperature within the generator to control the vapour pressure of fluorine in the excimer laser.

10. A gas management system for an excimer laser, the gas management system comprising a hydrogen chloride generator, said hydrogen chloride generator including a zeolite capable of absorbing commercially available hydrogen chloride;

means for heating said zeolite to evolve pure, gaseous hydrogen chloride, said hydrogen chloride having a vapour pressure;

means for introducing said hydrogen chloride into an excimer laser; and means for controlling the heating of said zeolite to control the vapour pressure of hydrogen chloride in the excimer laser.

11. A gas management system for an excimer laser having a halogen donor, the gas management system comprising a halogen generator including a material for generating halogen upon heating;

means for heating said material to evolve pure, gaseous halogen, said halogen having a vapour pressure;

means for introducing said halogen into an excimer laser;

means for controlling the temperature within the generator to control the vapour pressure of halogen in the excimer laser;

means for circulating gas from the laser through the halogen generator and back to the laser, said means for circulating gas comprising pipes; and valves for connecting said halogen generator to said pipes to control the flow of gas through said generator.

12. A gas management system as claimed in claim 11 which further comprises a cryogenic cleaner, said cryogenic cleaner being connected to said pipes by valves to control the flow of gas through said cryogenic cleaner.

13. A gas management system as claimed in claim 12 which further comprises a chemical gas cleaner, said chemical gas cleaner being connected to said pipes by valves to control the flow of gas through said chemical gas cleaner, gas leaving said chemical gas cleaner flowing immediately through said halogen generator.

14. A gas management system as claimed in claim 13 further comprising a ballast volume, said ballast volume being connected to said pipes by valves for transfer of the gas within said laser into the ballast volume.

15. A gas management system as claimed in claim 11 wherein said means for controlling the heating of said material comprises a thermocouple connected to a temperature controller.

16. A gas management system as claimed in claim 15 wherein said means for controlling the heating of said material comprises a power meter for measuring the energy output of the laser, an output of said power meter being connected to said temperature controller to maintain the laser power output at a required value.

17. A gas management system as claimed in claim 15 wherein said means for controlling the heating of said material comprises monitoring means for monitoring the halogen concentration of the gas within the system, an output of said monitoring means being connected to said temperature controller to maintain the laser output at a required value.

18. A gas management system as claimed in claim 11 wherein the halogen is fluorine and said material is a metal fluoro complex/compound.

19. A gas management system as claimed in claim 18 wherein the metal fluoro complex/compound is selected from the group consisting of fluoro-nickel compounds and an admixture of a fluoro-complex with a Lewis acid.

20. A gas management system as claimed in claim 18, wherein the metal fluoro complex/compound is selected from the group consisting of a Ni(IV) compound, a Ni(IV) mixture, a Ni(III) compound, a Ni(III) mixture, an admixture of a fluoro-complex with a Lewis acid, and a compound which evolves fluorine via thermal decomposition.

21. A gas management system as claimed in claim 20 wherein each of said Ni(IV) compound and said Ni(IV) mixture is $K_3NiF_7$, each of said Ni(III) compound and said Ni (III) mixture is $K_3NiF_6$, said admixture of a fluoro complex with a Lewis acid is selected from the group consisting of $K_2NiF_6$ with $BiF_5$, $Cs_2CuF_6$ with $BiF_5$, $Cs_2MnF_6$ with $BiF_5$, $K_2NiF_6$ with $TiF_4$, and $K_2NiF_6$ with $TiF_4$ and $BiF_5$, and said compound which evolves fluorine via thermal decomposition is $NF_4BiF_4$.

22. A gas management system as claimed in claim 18, wherein the compound is a fluoro-nickel compound comprising KF and $NiF_2$ in the approximate proportions of 3:1.

23. A gas management system as claimed in claim 22 wherein the compound is heated to a temperature in the range 200° C. to 1000° C. at a pressure in the range 1 to 10 atmospheres in order to fluorinate the compound.

24. A gas management system as claimed in claim 23 wherein the compound is next heated to a temperature in the range 150° C. to 250° C. in order to evolve pure, gaseous fluorine.

25. A gas management system as claimed in claim 11 wherein the halogen is hydrogen chloride and said material is zeolite.

* * * * *